United States Patent [19]

Schneider

[11] 4,106,984
[45] Aug. 15, 1978

[54] ROTATING SAFETY DRUM NUCLEAR REACTOR

[76] Inventor: Richard T. Schneider, 3550 NW. 33rd Pl., Gainesville, Fla. 32605

[21] Appl. No.: 727,485

[22] Filed: Sep. 28, 1976

[51] Int. Cl.² .............................................. G21C 7/08
[52] U.S. Cl. ..................................... 176/32; 176/39; 176/45; 176/58 PB
[58] Field of Search ................................... 176/27–29, 176/45–49, 58 PB, 60, 39, 32

[56] References Cited

U.S. PATENT DOCUMENTS

| 2,990,349 | 6/1961 | Roman | 176/45 |
| 3,046,212 | 7/1962 | Anderson | 176/45 |
| 3,089,835 | 5/1963 | Schulten et al. | 176/32 |
| 3,287,910 | 11/1966 | Silverstein | 176/45 |
| 3,321,378 | 5/1967 | Thomson | 176/28 |
| 3,349,002 | 10/1967 | Trbojevich | 176/29 |
| 3,377,251 | 4/1968 | Hanthorn et al. | 176/49 |
| 3,730,832 | 5/1973 | Jackomis | 176/39 |

FOREIGN PATENT DOCUMENTS

| 772,404 | 4/1957 | United Kingdom | 176/28 |
| 957,955 | 5/1964 | United Kingdom | 176/45 |

*Primary Examiner*—Harvey E. Behrend
*Attorney, Agent, or Firm*—R. Sciascia; R. Beers; Sol Sheinbein

[57] ABSTRACT

A gas cooled nuclear fission reactor employing spherical fuel elements which are held in a critical assembly configuration by centrifugal forces. This is accomplished by inserting the spherical fuel elements in a rotating drum of a shape suitable to ensure that a nuclear critical configuration of the total entity of fuel elements can only be achieved if the centrifugal forces are present. This has the effect that in case of a loss of load, a loss of coolant or other adverse occurences, the critical part of the reactor will disassemble itself, by gravitational forces exclusively, into a non-critical configuration.

9 Claims, 2 Drawing Figures

4,106,984

ROTATING SAFETY DRUM NUCLEAR REACTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a gas cooled nuclear fission reactor and more particularly to such a reactor using spherical fuel elements featuring inherent safety mechanisms which rely on gravity only.

A need for a low weight, high power density nuclear reactor for electricity generation on ship board has become acute. Since weight and space requirements are important factors for such application and since liquid metal cooled reactors are not attractive for this application due to safety considerations, existing knowledge suggests that a gas cooled reactor will allow operation at highest possible temperatures and so afford achievement of highest possible power densities.

Gas cooled reactors employing spherical fuel elements have been used before for land based operation. These reactors do not, however, use a rotating fuel element container. They do not allow an emergency shut down within seconds, since control rods have to be driven into the heap of spherical fuel elements, which take considerable force and time. The heap of spherical fuel elements are contained in a stationary hour-glass shaped container, in these reactors, which for safe and steady operation could not tolerate the rolling of a ship, since this would cause movement of the spheres in respect to each other, which in turn would change the reactivity of the total system, thus causing fluctuations in power generation or even dangerous power excursions.

SUMMARY OF THE INVENTION

Accordingly, the present invention provides for a gas cooled nuclear reactor employing spherical fuel elements inserted into a rotating cylindrical drum. Upon rotation of the drum, the fuel elements are kept to the periphery of the drum to form a cavity in the center of the drum. Control rods are then inserted to retain the fuel elements in place when the drum is not rotating. Helium gas is passed through said fuel elements during operation, at which time the rods are partially raised to achieve the desired power level, and the heated gas removed from the drum to convert the thermal into mechanical or electrical energy, whereupon it is recirculated to the reactor. A supply pipe is provided for the addition of fuel elements to the rotating drum and various failsafe systems are provided the reactor to prevent any accidents.

OBJECTS OF THE INVENTION

It is therefore an object of the present invention to provide for a gravitational disassembly mechanism for gas cooled reactors employing spherical fuel elements enabling a rapid shutdown.

Another object of the present invention is to provide for a centrifugal force created cavity within a reactor core, for enabling insertion of reactivity control rods during operation.

A still further object of the present invention is to provide for a sturdy containment of spherical fuel elements.

Still another object of the present invention is to provide for retaining spherical fuel elements in their relative location during normal operation.

Yet another object of the present invention is to provide for adding individual fuel elements to a reactor core during operation of the reactor.

Another object of the present invention is to provide for a rotating fuel element container for a gas cooled reactor.

BRIEF DESCRIPTION OF THE DRAWINGS

A more complete appreciation of the invention and the many attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
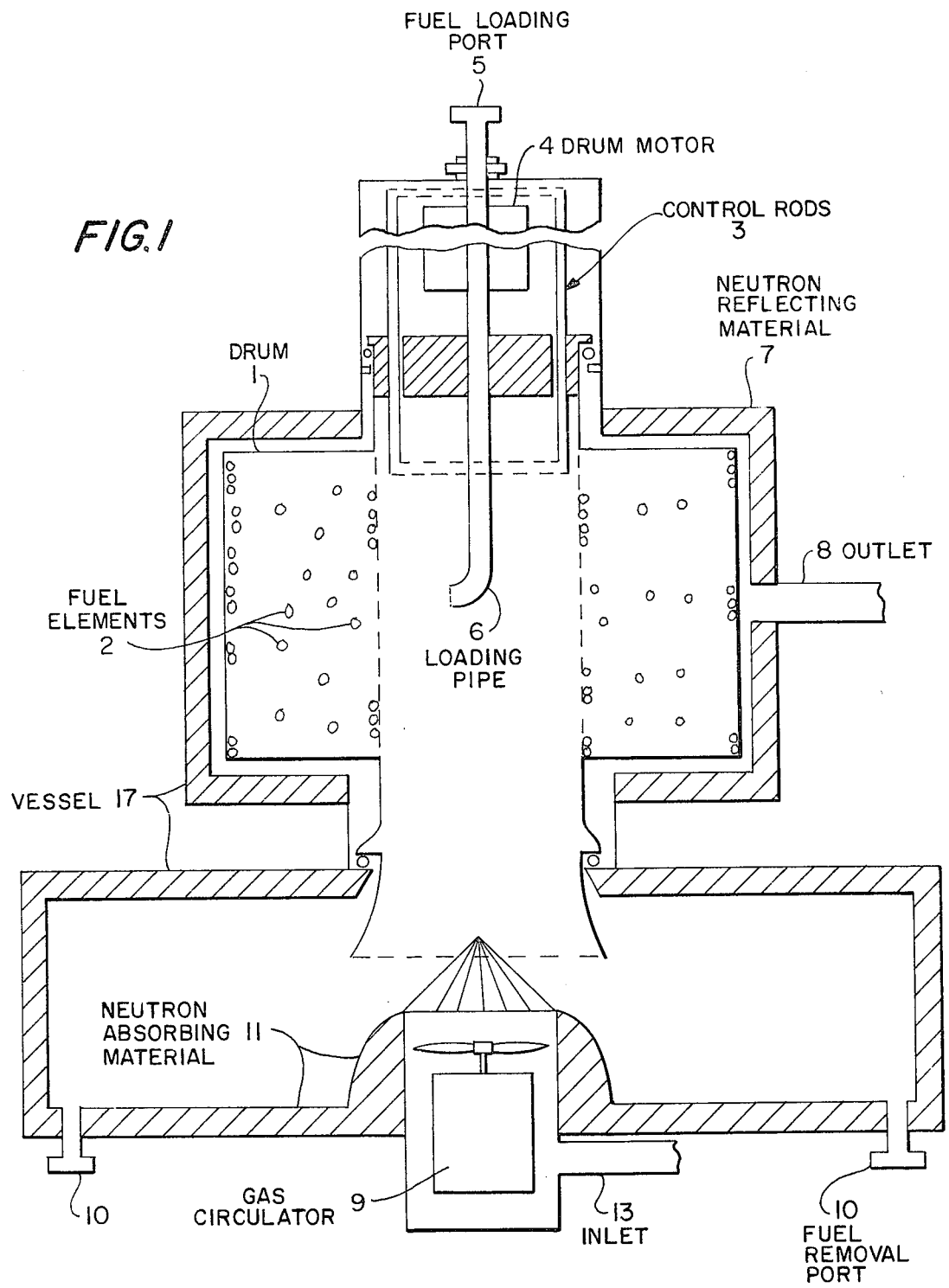
FIG. 1 is a schematic diagram of the reactor configuration of the present invention.

Referring now to the drawings, wherein like reference numerals designate identical or corresponding parts throughout the several views and more particularly to FIG. 1 thereof, a rotating cylindrical drum 1 lined with neutron reflecting material 7 is designed to resemble a swirl cage. Spherical fuel elements 2 are placed within drum 1 and are free to move to a location enforced by the centrifugal forces which build up, when drum 1 is set in motion by drum motor 4. Fuel elements 2 can have any size and any shape similar to spheres but, according to existing knowledge, equal sized shperes of about 5 cm diameter are most advantageous. They are manufactured out of graphite or any other suitable material and contain fissile, fissionable and if desired fertile nuclear material in the shape of coated particles, pellets or any other suitable form imbedded in a graphite or other moderating or non-moderating matrix.

While rotating, safety drum 1 is filled with fuel elements 2 with the aid of the fuel loading pipe 6 through the fuel loading port 5. Care is taken that only so many fuel elements are added as to allow the formation of a cavity in the center of the drum, large enough to allow free movement of a set of control rods 3 into this cavity without touching any fuel elements 2.

Control rods 3 are connected to each other for the sake of mechanical stability by rings (not shown) on both ends. The distance between these rods is smaller than the diameter of a fuel element. The distance between adjacent rods forming the drum is chosen close enough to prevent the spherical fuel elements 2 from escaping yet are wide enough to allow an ordered deposition of the first layer of spheres.

After drum 1 has been filled with the required number of fuel elements 2, control rods 3 can be inserted fully into the cavity surrounded by fuel elements 2 and the rotation of the drum 1 can be stopped. When fully inserted, rods 3 serve to hold fuel elements 2 in the now stationary drum 1. The number of fuel elements 2 and size and/or shape of drum 1 are selected in a way that the reactor is subcritical under the presently described conditions.

Figure 2:
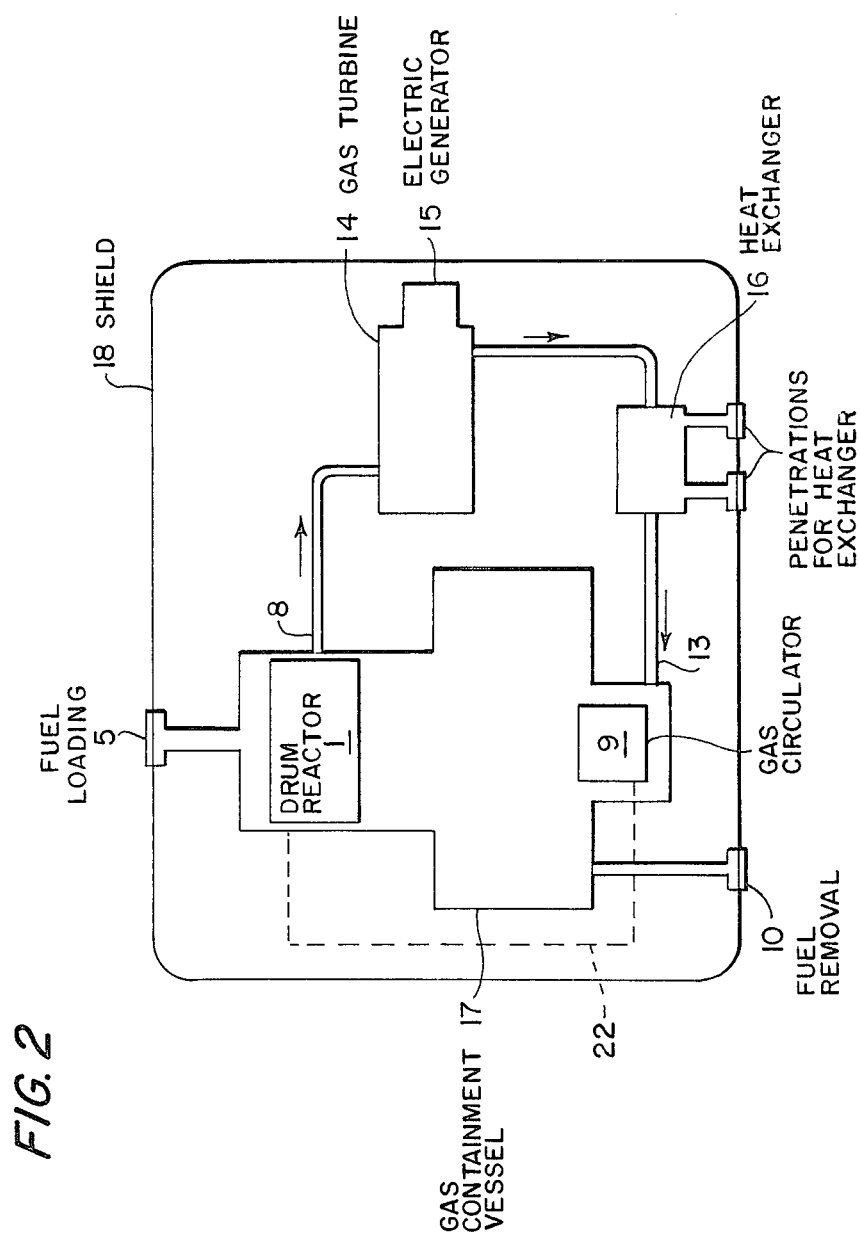
FIG. 2 is a schematic diagram of a total functional system for use with the reactor illustrated in FIG. 1.

For reactor start up, drum 1 is set in motion and the set of control rods 3 is withdrawn from the cavity at least partially until the desired power level is achieved. The power extraction is accomplished by forcing a gas (working fluid), preferably helium, through the voids between the sphere with the aid of a gas circulator 9. The heated gas leaves the reactor through the working fluid outlet 8 and enters a gas turbine 14, as can be seen in FIG. 2, where the thermal energy of the gas is converted into mechanical energy and subsequently, if desired, into electrical energy with the aid of the generator 15. After removal of any remaining heat by heat exchanger 16, the gas is returned to the gas circulator 9, and thereby to the reactor, through the working fluid inlet 13.

Shutdown of the reactor is accomplished by reinserting the control rods 3 again completely into the cavity. If a malfunction of the auxiliary systems should occur, which could prevent the reinsertion of control rods 3, and if in addition a loss of coolant, i.e., the gas which is used to cool the fuel elements for purposes of power extraction, should occur, an emergency shut down can be accomplished by stopping the rotation of the drum 1 or the drum will stop by itself due to the loss of power for the drum motor 4. Without the control rods 3 completely inserted, the fuel elements will fall out of the rotating drum and settle in that part of the gas containment vessel 17, which is lined with neutron absorbing material 11 where they can be removed through ports 10. The configuration of the resulting fuel element heap will no longer be nuclear critical due to geometrical reasons. The cessation of rotation can be achieved by a suitable braking system, or can be achieved by letting the movement of the drum be decreased by inherent friction. The latter can be aided by suitably located metallic expansion rings, which, if a safe temperature is exceeded, will expand and press against moving parts of the drum. Other mechanical breaking mechanisms may be used.

Gas containment vessel 17, gas turbine 14, generator 15 and heat exchanger 18 are located within a secondary containment and biological shield 18. The rotating safety drum 1 and/or the gas containment vessel 17 may have various shapes. For example, the drum may be funnel shaped.

Gas circulator 9 may be driven mechanically by suitable gearing from the drum motor 4 as shown by the dashed line 22 in FIG. 2, or it may be driven by a separate electric motor connector so that it will stop when the drum motor 4 stops. Furthermore, the working fluid outlet 8 may comprise several outlets spaced approximately around the gas containment vessel 17.

The safety reactor may, if desired, be mounted on a gyroscopically stabilized platform (not shown) permitting the position of the rotating drum 1 to remain the same regardless of the rolling of the ship on which it may be used. The mass of the rotating drum 1 and fuel elements 2 may be utilized in maintaining the stability of the platform.

There has therefore been described a gas cooled nuclear fission reactor wherein fuel elements are held in place by gravitational forces. The centrifugal force and the mass of the drum stabilizes the position of the reactor. Additional elements may be inserted while the reactor is operating into a centrifugally created cavity within the reactor, eliminating the requirement for displacement of the spherical elements by mechanical forces. Gravity power alone enables for disassembly of the reactor, enabling a rapid and safe shutdown thereof.

Obviously, many modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A nuclear reactor, comprising:
   a rotatable drum;
   means for rotating said drum about its longitudinal axis when said reactor is operative thereby inducing centrifugal forces within said drum;
   a plurality of solid fuel elements disposable within said drum, said fuel elements moving to a desired configuration about said longitudinal axis upon the application of said centrifugal forces thereby forming a central cavity within said drum;
   means for loading said fuel elements within said drum;
   a plurality of control rods insertable within said cavity and proximate said longitudinal axis, said control rods being spaced such that the distance between adjacent rods is less than the diameter of a fuel element;
   means for partially inserting said control rods into said cavity when said reactor is operative and for fully inserting said control rods into said cavity when said reactor is not operative in order to retain said fuel elements between the walls of said drum and said control rods;
   whereby when said reactor is operative and said control rods are not fully inserted, said fuel elements are held fixed along the walls of said drum by said centrifugal forces and form a critical mass within said desired configuration, and when said reactor is not operative and said control rods are fully inserted, said fuel elements are retained within said drum in a subcritical condition.

2. A nuclear reactor as recited in claim 1 wherein said fuel elements are spherically shaped and further including a neutron-absorbing liner area disposed below a fuel element outlet in said drum and aligned with said longitudinal axis, whereby if said drum is stopped from rotating when said control rods are not fully inserted, said fuel elements may drop under the influence of the force of gravity into said area and said critical mass may be safely dispersed.

3. A nuclear reactor as recited in claim 2 wherein said loading means comprises a conduit for inserting additional fuel elements into said drum during rotation of said drum, wherein said additional elements are inserted within said drum and join said plurality of fuel elements in said desired configuration.

4. A nuclear reactor as recited in claim 3 further including a gas circulator situated below said drum to force a working fluid into an inlet in said drum and through said fuel elements when said drum is rotating and said rods are partially withdrawn from said cavity to achieve the desired power level and heat said working fluid.

5. A nuclear reactor as recited in claim 4 further including an outlet on said drum whereby heated working fluid may be removed therefrom.

6. A nuclear reactor as recited in claim 5 further including a gas turbine for converting said heated working fluid into mechanical energy, and an electrical generator for converting said mechanical energy to electrical energy.

7. A nuclear reactor as recited in claim 6 further including a heat exchanger coupled to said electric generator for removing excess heat, said working fluid thereupon returning to said gas circulator.

8. A nuclear reactor as recited in claim 7 wherein said working fluid is helium gas and said fuel elements comprise graphite spheres approximately 5 cm in diameter.

9. A nuclear reactor as recited in claim 8 wherein said rotating means comprises a drum motor, said drum being lined with a neutron reflecting material.

* * * * *